(12) United States Patent
Dittli et al.

(10) Patent No.: US 11,221,041 B2
(45) Date of Patent: Jan. 11, 2022

(54) BEARING UNIT WITH THREE BEARINGS INCLUDING A PRELOAD BEARING, IN PARTICULAR FOR A PAPER PROCESSING TOOL (71) Applicant: BOBST MEX SA, Mex (CH)

(72) Inventors: Oskar Dittli, Lausanne (CH); Pierre Robadey, Lausanne (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 16/648,156

(22) PCT Filed: Sep. 21, 2018

(86) PCT No.: PCT/EP2018/025241
§ 371 (c)(1),
(2) Date: Mar. 17, 2020

(87) PCT Pub. No.: WO2019/057340
PCT Pub. Date: Mar. 28, 2019

(65) Prior Publication Data
US 2020/0232504 A1    Jul. 23, 2020

(30) Foreign Application Priority Data
Sep. 22, 2017 (EP) .................................. 17020436

(51) Int. Cl.
*F16C 25/06* (2006.01)
*F16C 19/54* (2006.01)
(Continued)

(52) U.S. Cl.
CPC ............ *F16C 25/06* (2013.01); *F16C 13/026* (2013.01); *F16C 25/08* (2013.01); *F16C 19/46* (2013.01);
(Continued)

(58) Field of Classification Search
CPC ...... F16C 13/02; F16C 13/024; F16C 13/026; F16C 13/08; F16C 19/54; F16C 23/10; F16C 25/02; F16C 25/06
See application file for complete search history.

(56) References Cited

U.S. PATENT DOCUMENTS 1,162,125 A  *  11/1915  Bassett .................. F16C 27/04
                                                     384/535
1,427,818 A       9/1922  Hutchinson et al.
(Continued)

FOREIGN PATENT DOCUMENTS

FR    2507713    * 12/1982
GB     893451    *  4/1962
(Continued)

OTHER PUBLICATIONS

International Search Report dated Nov. 7, 2018, in counterpart application PCT/EP2018/025241.

*Primary Examiner* — James Pilkington
(74) *Attorney, Agent, or Firm* — Bookoff McAndrews, PLLC (57) ABSTRACT

A very compact play-free bearing unit includes a bearing that runs without play while having a reasonably large play when assembling and during disassembly of the bearing unit from its axle. The bearing unit uses three bearings, one of which is mobile, and thanks to a preloading mechanism the play is removed when loaded. Thanks to an amplification lever, the preloading unit is able to function either with a pneumatic actuator or with a hydraulic actuator.

19 Claims, 6 Drawing Sheets

(51) Int. Cl.
*F16C 23/10* (2006.01)
*F16C 13/02* (2006.01)
*F16C 25/08* (2006.01)
*F16C 19/46* (2006.01)
*F16C 25/02* (2006.01)

(52) U.S. Cl.
CPC .............. *F16C 19/54* (2013.01); *F16C 23/10* (2013.01); *F16C 25/02* (2013.01)

(56) References Cited

U.S. PATENT DOCUMENTS

| | | | |
|---|---|---|---|
| 2,600,707 | A | 6/1952 | Turnbaugh |
| 2,703,735 | A | 3/1955 | Falk et al. |
| 2,825,217 | A | 3/1958 | Byrd |
| 3,347,157 | A | 10/1967 | Kemp |
| 7,008,108 | B2 * | 3/2006 | Wanger .................. F16C 23/10 384/100 |
| 10,173,854 | B2 * | 1/2019 | Rovellini ................ F16C 23/00 |
| 2004/0069617 | A1 | 4/2004 | Wanger |
| 2007/0071384 | A1 | 3/2007 | Dambaugh et al. |
| 2017/0268566 | A1 * | 9/2017 | Beguin ................ F16C 13/026 |

FOREIGN PATENT DOCUMENTS

| | | |
|---|---|---|
| JP | H08163815 A | 6/1996 |
| JP | 2000517399 A | 12/2000 |
| JP | 2004538425 A | 12/2004 |
| KR | 20170088909 A | 8/2017 |
| WO | 2002038974 A1 | 5/2002 |
| WO | 2016087052 A1 | 6/2016 |

\* cited by examiner

-- PRIOR ART --

BEARING UNIT WITH THREE BEARINGS INCLUDING A PRELOAD BEARING, IN PARTICULAR FOR A PAPER PROCESSING TOOL

CROSS-REFERENCE TO RELATED APPLICATION(S)

This application is a National Stage under 35 U.S.C. § 371 of International Application No. PCT/EP2018/025241, filed on Sep. 21, 2018, which claims priority to European Patent Application No. 17020436.6, filed Sep. 22, 2017, the contents of all of which are incorporated by reference in their entirety.

The invention relates to a bearing unit, in particular for a rotary processing tool, having two outer bearings and an intermediate bearing, and a preloading unit adapted for displacing one of the bearing groups with respect to the other bearing group.

PRIOR ART

A bearing unit of this type is known from the document WO 2016/087052. It serves for receiving an end of a shaft of a drum. The drum is part of the rotary processing tool which can be a printing machine or a machine for manufacturing packages.

Figure 1:
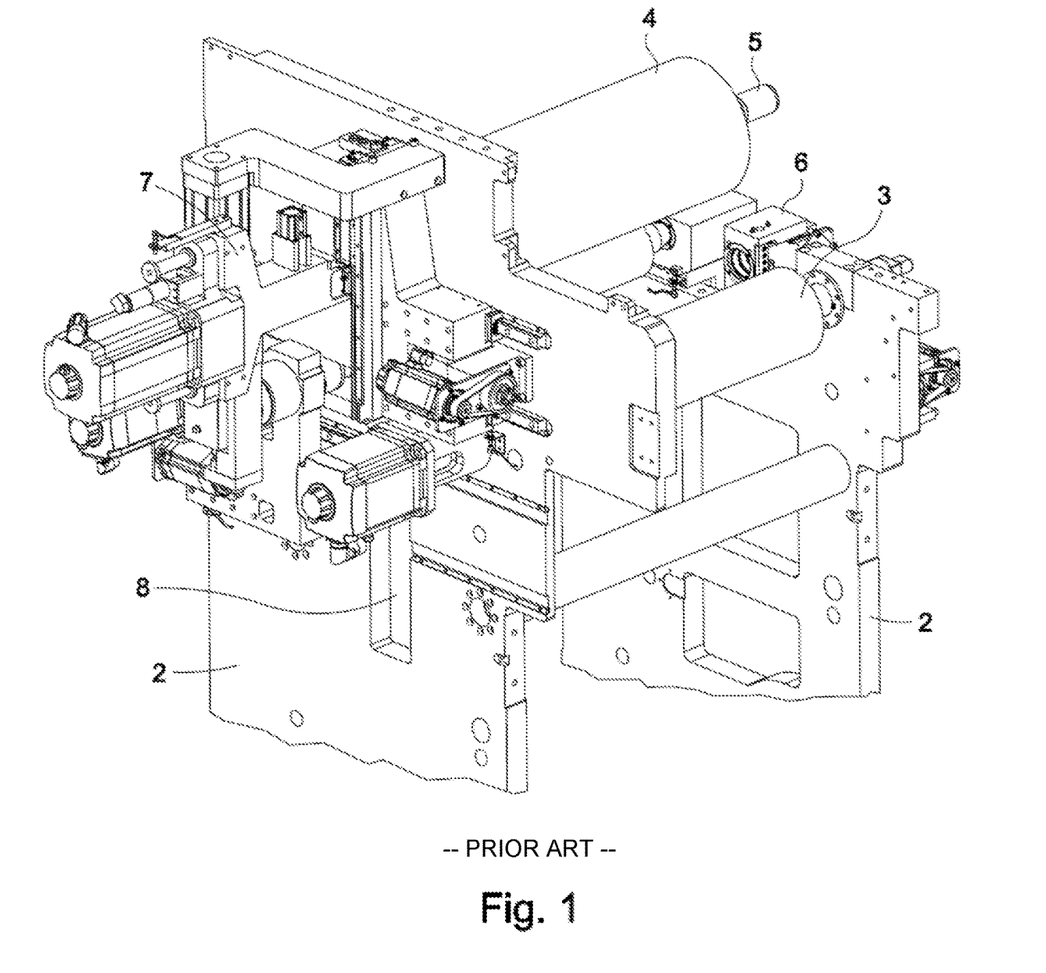
FIG. 1 shows a rotary processing tool provided with a bearing unit.
Figure 2:
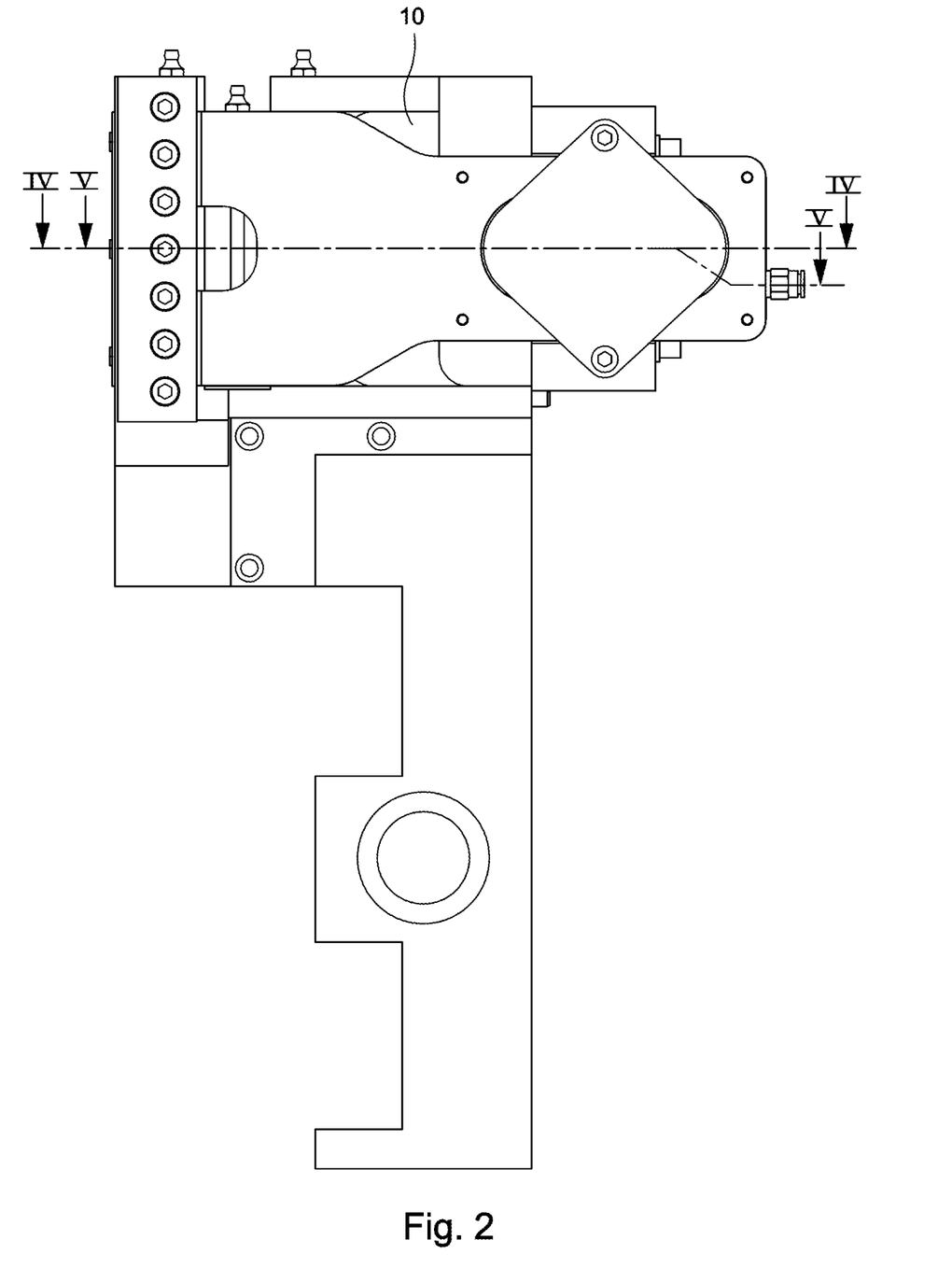
FIG. 2 is a first side view of the bearing unit.

An example of such rotary processing unit can be seen in FIG. 1. The machine has a machine frame 2 which supports all the components. Among the components there is a stationary drum 3 and a movable drum 4.

In FIG. 1, movable drum 4 is shown in a position in which it has been displaced with respect to its working position both in an axial direction and in a vertical direction. Thus, a bearing stud 5 of drum 4 is not supported in an associated bearing unit 6.

On the side opposite bearing stud 5, drum 4 is supported in a carriage 7 which is mounted to machine frame 2 so as to be displaceable in a vertical direction. A slot 8 is provided to this end. Furthermore, carriage 7 allows to axially displace drum 4 when it is in a suitable position.

In order to set the rotary processing tool of FIG. 1 in a working condition, drum 4 is first lowered in a vertical direction and then advanced in an axial direction to the right so as to engage bearing stud 5 into bearing unit 6.

Bearing unit 6 is configured for supporting bearing stud 5, in a working condition, without play. At the same time, it has to be possible to axially insert or retract bearing stud 5 from bearing unit 6. This is achieved by choosing an outer diameter for bearing stud 5 which is slightly less than the inner diameter of the bearings contained in bearing unit 6, thereby allowing an axial insertion of bearing stud 5 into bearing unit 6 without mechanically damaging the bearing stud or the bearings. The resulting play is eliminated, after the bearing stud 5 has been inserted into bearing unit 6, by displacing one of the bearing groups with respect to the other bearing group in a radial direction.

By eliminating the play, we can eliminate most spurious vibrations that would appear when the press is running at high speed.

In the above-mentioned prior art document, the displacement is achieved by mounting the intermediate bearing so as to be displaceable in a radial direction within a bearing unit, and by having the preloading unit exert a force onto the intermediate bearing. As a result, bearing stud 5 is "clamped" between the two outer bearings which are stationary, and the intermediate bearing which is displaced in a radial direction.

In the prior art, the preloading unit is a piston connected to the intermediate bearing or a support of the intermediate bearing, thereby exerting the required preloading force on the intermediate bearing.

As the force for preloading the intermediate bearing has to be quite high (in the order of 5 to 10 kN), the diameter of the piston in the preloading unit has to be significant. This creates some problem as space in the vicinity of the bearing unit is limited.

SUMMARY OF THE INVENTION

The object of the invention thus is to propose a bearing unit which requires less space but at the same time is mechanically simple and allows exerting significant preloading forces.

In order to achieve this object, the invention proposes a bearing unit as defined above, characterized in that the preloading unit comprises an amplification lever arranged for converting an actuation force into a greater preloading force. The invention is based on the general idea of using a mechanical amplification which converts a smaller force of the preloading unit into a greater force available for displacing the bearings with respect to each other. This allows using a smaller preloading unit which can be more easily fitted to the bearing unit.

Preferably, the lever cooperates with the intermediate bearing which then is the one arranged so as to be displaceable with the outer bearings. From a mechanical standpoint, the same effect (supporting the bearing stud without any play) can also be achieved by displacing the two outer bearings with respect to the intermediate bearing.

In addition to removing the play, the preloading allows changing some mechanical characteristics of the drum. For example, the natural frequency (or resonance frequency) of the rotary processing unit can be changed by varying the preloading force. Also, the (micrometric) deformation profile of the drum is affected by the preloading force.

According to a preferred embodiment, the amplification lever is a one-armed lever, meaning that both the preloading unit and the bearing which is displaced are arranged at the same side of the lever as compared to its pivot axis. This configuration results in a short length of the amplification lever and thus contributes to the compactness of the bearing unit.

In an advantageous manner, the amplification lever extends parallel to an axis of rotation of bearings. Such an arrangement of the amplification lever according to the axial direction owing to the thickness of the amplification lever results in a small size of the bearing unit associated with the preloading unit. The volume for inserting the preloading unit is limited as the rotary processing tool of the printing machine comprises in the same zone also other drums having their own bearings. This arrangement for the amplification lever contributes to the compactness of the bearing unit.

Preferably, an end of the amplification lever engages behind a support provided at the bearing unit. It is thus not necessary to provide for a sophisticated pivot bearing for the amplification lever. Rather, a simple mechanical engagement is sufficient, again contributing to a compact configuration of the bearing unit.

Preferably, the support is a separate element fastened to the bearing unit, thereby allowing replacing it in a simple manner in case of need.

The end of the amplification lever engaging behind the support is preferably formed in a fork-like manner, thereby providing a wide, mechanically stable support for the amplification lever.

According to a preferred embodiment, the preloading unit is a pneumatic actuator adapted for pivoting the amplification lever with respect to the bearing unit. Pneumatic pressure is usually readily available at a rotary processing tool for which the bearing unit according to the invention can be used.

According to an alternative embodiment, the preloading unit is a hydraulic actuator adapted for pivoting the amplification lever with respect to the bearing unit.

Hydraulic pressure allows applying higher pressure than when using a pneumatic actuator.

The actuator preferably comprises a piston cylinder unit arrangement in which the piston is held stationary with respect to the bearing unit. It has been found that the preloading unit can be formed in a more compact manner if it is not the piston which is being moved, but the cylinder.

A very compact configuration is achieved by forming the cylinder as a through-hole in the amplification lever. It is only necessary to close one side of the cylinder. This can be achieved by mounting a cover which is associated with the through-hole. The cover has to withstand only the pressure within the cylinder chamber. Thus, a comparatively small thickness is sufficient.

Preferably, two pistons are provided which are arranged in two cylinder openings arranged along a centerline of the amplification lever. Using two pistons increases the force which is made available by the preloading unit. Arranging the pistons spaced from each other along the centerline of the amplification lever ensures that the width of the preloading unit remains small.

Preferably, a connection opening is formed in the lever for establishing a pressure connection between the cylinder openings, thereby avoiding external tubings or hoses.

According to a preferred embodiment, a sealing element is provided for sealing between the inner wall of the cylinder and the piston arranged therein and for centering the piston within the cylinder. The piston can be arranged in a "floating manner" meaning that it can move in a radial direction. It is sufficient if the axial displacement of the piston is prevented. To this end, the piston can for example rest on an abutment plate.

The abutment plate is connected to the bearing unit with two anchors, the anchors extending on opposite sides of the amplification lever. This again adds to a compact configuration of the bearing unit.

The height of the actuator, measured in parallel with the actuating direction, is not more than three times the thickness of the amplification lever. This allows using the preloading unit in very confined spaces.

BRIEF DESCRIPTION OF THE DRAWINGS

The invention will now be explained with reference to an embodiment shown in the drawings. In the drawings.

DETAILED DESCRIPTION OF PREFERRED EMBODIMENTS

A bearing unit 6 according to the invention is shown in detail in FIGS. 2 to 7. It comprises a main body 10 adapted for being connected to machine frame 2 and carrying three bearings.

Figure 4:
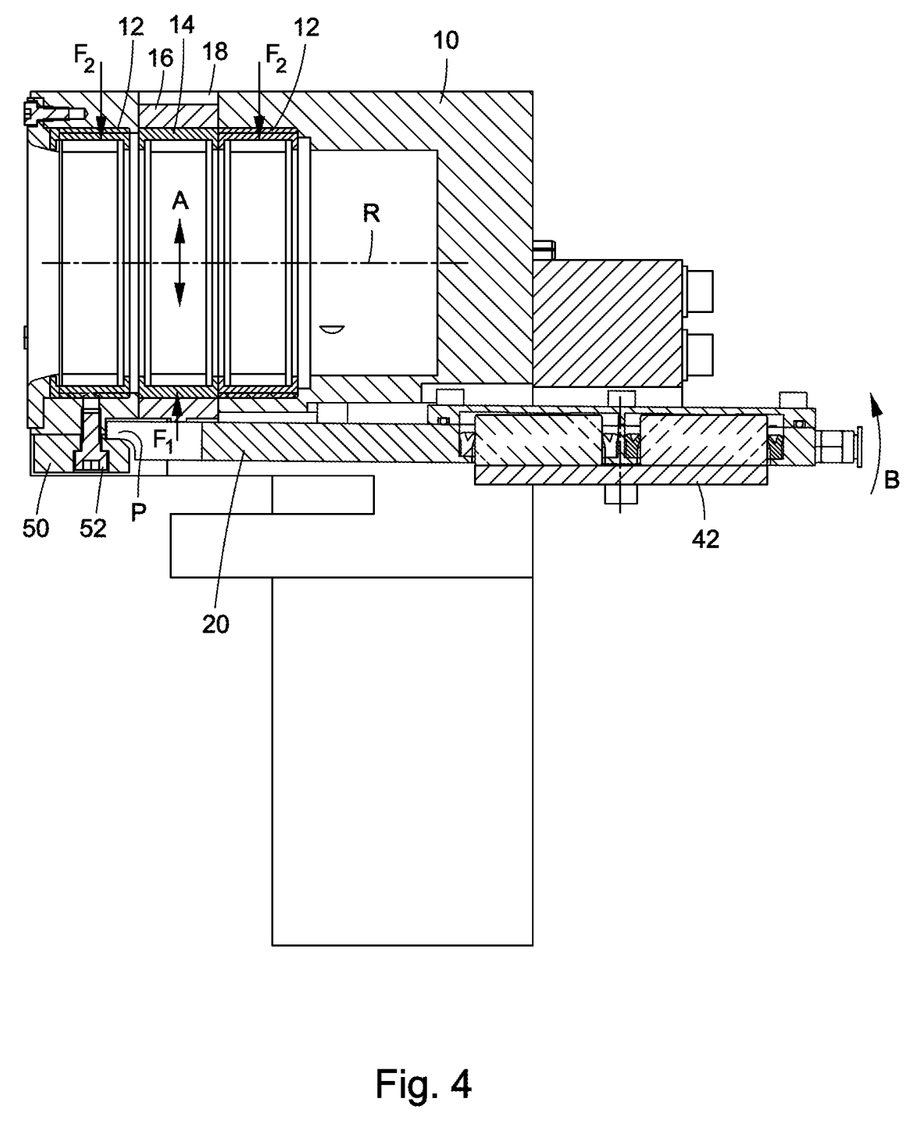
FIG. 4 is a sectional view of the bearing unit of FIG. 3 along the plane IV-IV of FIG. 2.
Figure 5:
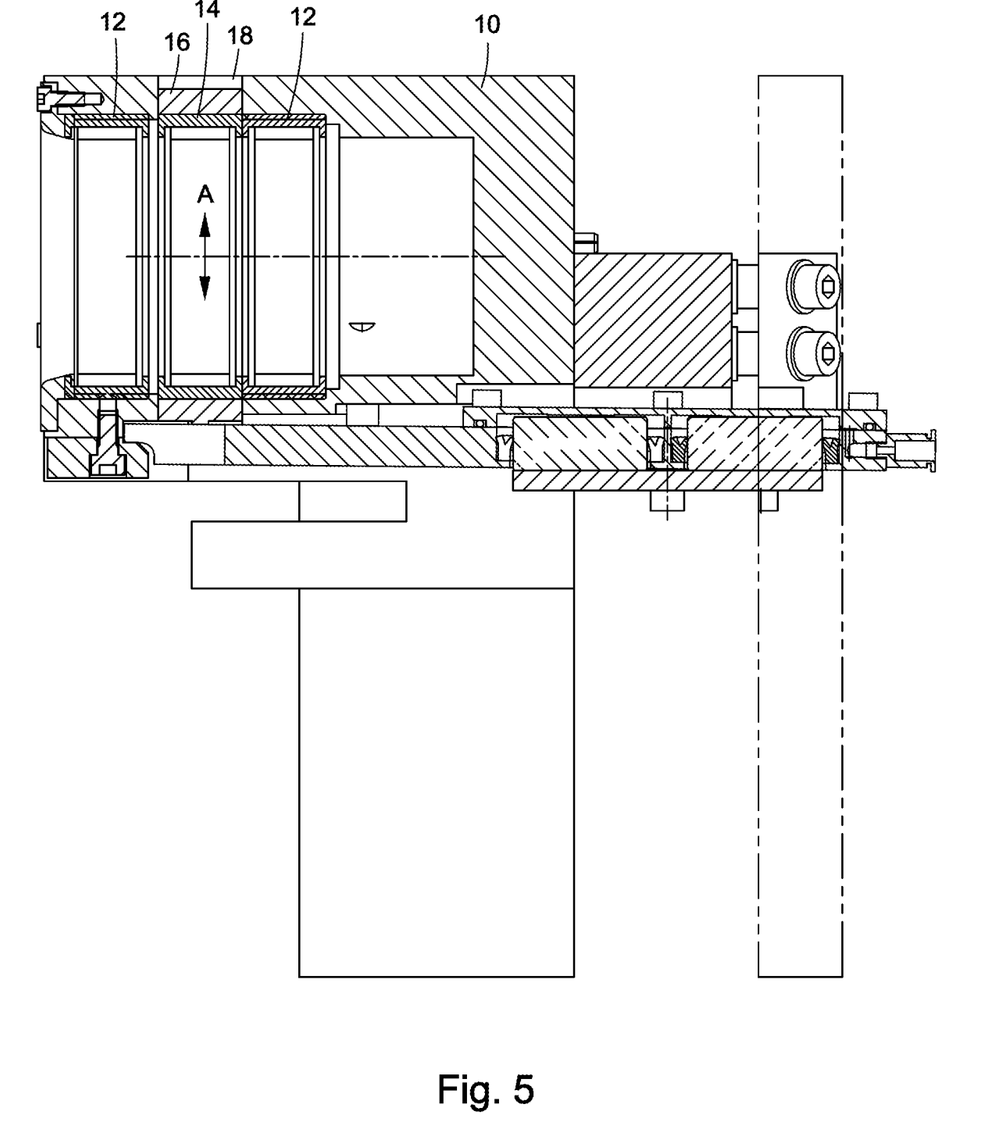
FIG. 5 is a view similar to the view of FIG. 4, sectioned along plane V-V of FIG. 2.

As can be seen in particular in FIGS. 4 and 5, a first group of bearings 12 is provided, which here consists of bearings which are held stationary within main body 10. Further, a second group is provided which here consists of a bearing 14. Bearing 14 is arranged in between bearings 12 and is mounted within main body 10 so as to be displaceable in a radial direction (see the arrow A in FIGS. 4 and 5). To this end, bearing 14 is accommodated in a slider 16 which is received within a recess 18 in main body 10.

Because of their position with respect to each other, bearings 12 can be referred to as being outer bearings while bearing 14 is an intermediate bearing.

Figure 6:
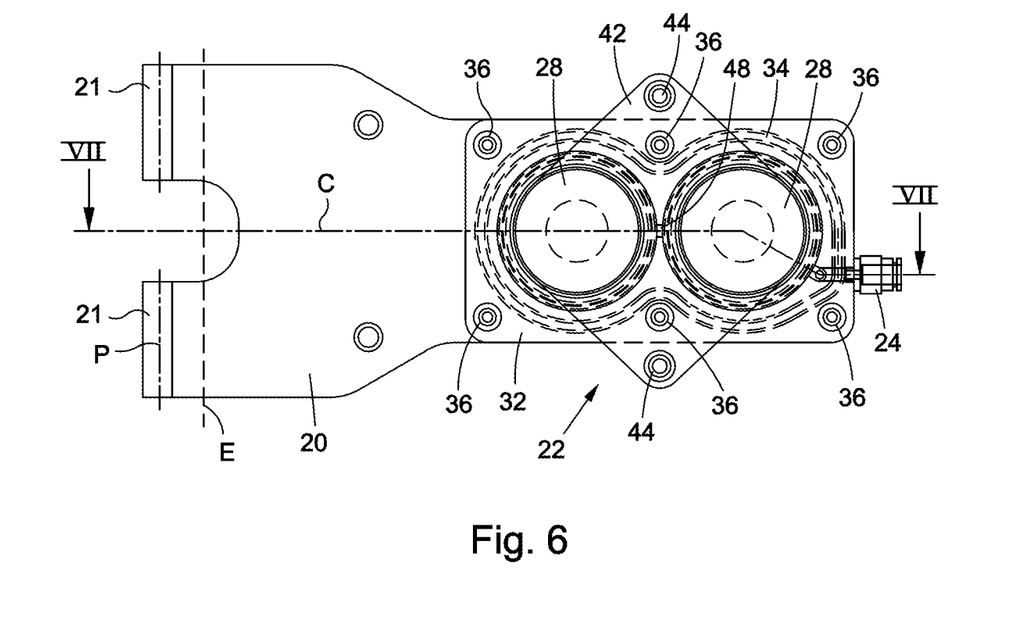
FIG. 6 is a plan view of the amplification lever with the pneumatic actuator.
Figure 7:
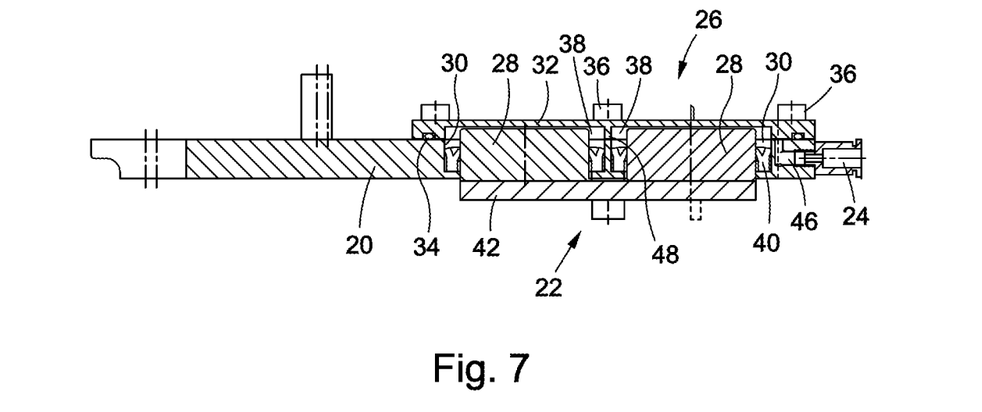
FIG. 7 is a cross-section through the amplification lever and the actuator of FIG. 6 along plane VII-VII.

In order to displace slider 16 and therewith bearing 14 with respect to main body 10 and outer bearings 12, a preloading unit is provided, of which the main components can be seen in FIGS. 6 and 7.

The preloading unit comprises an amplification lever 20 and an actuator 22. Amplification lever 20 serves for amplifying an actuation force created by an actuator 22, into a greater preloading force acting on slider 16 and intermediate bearing 14.

As can be seen in particular in FIG. 6, amplification lever 20 is formed at its end comprising the axis of pivot P, in a fork-like manner in that there are two spaced engagement portions 21. The line of engagement E between amplification lever 20 and slider 16 is arranged between the pivot axis P around which amplification lever 20 pivots with respect to main body 10, and the location of actuator 22. Thus, amplification lever 20 is a one-armed lever.

The basic structure of amplification lever 20 is a solid metal plate which at one end (in FIGS. 6 and 7 on the left side) is supported at bearing unit 6 and at the opposite end carries actuator 22. The metal plate of the amplification lever 20 extends and is held so that a centerline C of the amplification lever 20 is parallel to the axis of rotation R of bearings 12 and 14 and to the rotation axis of the bearing stud 5. As an example shown in FIGS. 4 and 5, the amplification lever 20 is placed under the main body 10. The bulkiness of the main body 10 with the amplification lever 20 is reduced.

Advantageously, the amplification lever 20 may be connected to the main body 10 thanks a flexible plate (not shown) that acts as a flexible blade, and allows the amplification level to pivot around axis P. The function of the plate is to keep the amplification lever in place when the preloading unit is idle. As an alternative to the plate, one could use a hinge that pivots around axis P, but since the amplitude of the pivoting is low and the forces in play are big, the plate solution is preferred.

In order to obtain a high amplification factor, the line of engagement E is arranged close to pivot axis P. Thus, an amplification ratio in the order of 5 to 10 can be obtained.

In the particular embodiment, amplification factors in the order of 6 to 7 have been proven effective.

The high amplification factor is made possible along with the compactness of the setup thanks to the fact that the necessary displacement of the slider is of the order of 1 mm, maximum 2 mm.

The actuator 22 is formed as a pneumatic actuator to which pneumatic pressure can be supplied via a pneumatic connection 24.

For transferring a pneumatic pressure into a displacement of amplification lever 20, actuator 22 comprises a piston/cylinder unit 26 having two pistons 28 arranged within cylinders 30 formed in amplification lever 20.

Cylinders 30 are formed by circular holes which extend entirely through amplification lever 20 from one of its major side surfaces towards the other. On one of their sides, cylinders 30 are closed by means of a cover 32 which is connected to one of the major outer surfaces of amplification lever 20. A seal 34 seals between cover 32 and amplification lever 20. Four mounting screws 36 serve for evenly compressing seal 34 so as to tightly seal cylinder chambers 38.

Pistons 28 are arranged freely floating within the cylinder chambers 38. Their position in a radial direction is determined by a circular seal 40 which seals between the inner wall of the respective cylinder 30 and the outer contour of the respective piston 28.

Pistons 28 rest with their end face opposite cover 32 on an abutment plate 42 which is held at bearing unit 6 by means of anchors 44.

As can be seen in particular in FIGS. 6 and 7, two pistons 28 are arranged in two cylinders 30 positioned adjacent each other on the centerline C of amplification lever 20. Pneumatic pressure can be applied to the cylinder chamber 38 adjacent pneumatic connection 24 via an internal channel 46 formed within amplification lever 20. A connection opening 48 is formed in amplification lever 20 between the two cylinders 30 so as to ensure that the pneumatic pressure established in the first cylinder chamber 38 is also present in the second cylinder chamber.

Figure 3:
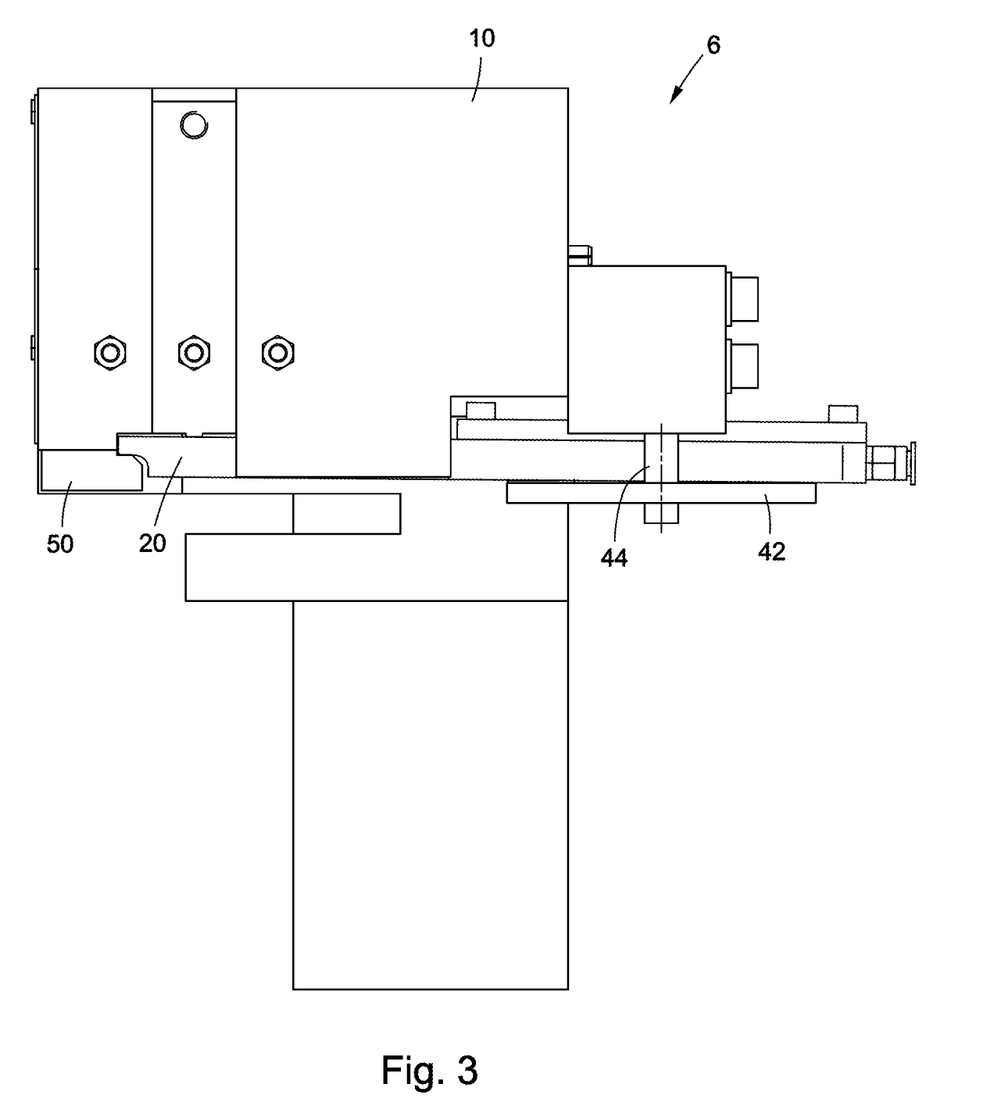
FIG. 3 is a second side view of the bearing unit.

The manner in which the preloading unit formed from amplification lever 20 and actuator 22 is mounted to bearing unit 6, can, in particular, be seen from FIGS. 3 to 5.

Amplification lever 20 engages with its free end opposite actuator 22 behind a support 50 provided at main body 10. Support 50 is here formed as a separate element which is fastened to main body 10 by means of a plurality of fastening screws 52.

Support 50 forms a mechanical abutment for amplification lever 20 and defines the pivot axis. However, no pivoting hinge is formed. Rather, amplification lever 20 is simply slid into a recess formed between support 50 and main body 10 so as to be mechanically held in a direction which is perpendicular to the axis of rotation R of bearings 12 and 14. In a direction parallel to the axis of rotation R, amplification lever 20 can be disengaged from support 50 by being displaced towards the right (with respect to FIGS. 3 to 5).

Abutment plate 42 is mechanically connected via anchors 44 to bearing unit 6. Thus, any reaction force acting on pistons 28 is transmitted to bearing unit 6.

The anchors 44 extending on opposite sides of amplification lever 20, a very compact configuration is achieved. Anchors 44 can serve for mechanically guiding amplification lever 20.

The operation of bearing unit 6 will now be described with reference to FIG. 4. In a starting condition in which bearing stud 5 is to be inserted into bearing unit 6, intermediate bearing 14 is in a position in which its axis of rotation coincides with the axis of rotation of outer bearings 12. Bearing stud 5 can then easily be inserted in an axial direction into bearing unit 6.

After bearing stud 5 is in the correct axial position, pressure is supplied to cylinder chambers 38. The pressure in cylinder chambers 38 tends to expel pistons 28 from the cylinder chambers. As the pistons 28, however, rest on abutment plate 42 which in turn is held stationary with respect to main body 10, the reaction force acting via cover 32 on amplification lever 20 results in the entire amplification lever 20 being rotated in a counterclockwise direction around pivot axis P (see arrow B in FIG. 4).

As amplification lever 20 cooperates with slider 16, the rotation of amplification lever 20 in a counterclockwise direction results in intermediate bearing 14 being displaced with respect to outer bearings 12. With reference to FIG. 4, intermediate bearing 14 is displaced upwardly, thereby exerting a force F1 on bearing stud 5. Corresponding reaction forces F2 are created at outer bearings 12. As a consequence, bearing stud 5 is held without play in bearing unit 6. Bearing unit 6 allows creating the necessary magnitude of radial thrust at intermediate bearing 14 while being very compact. In particular, actuator 22 has a height, measured in parallel with the direction of displacement of pistons 28 with respect to amplification lever 20, which is not more than three times the thickness of amplification lever 20.

Also, the external footprint of the complete bearing, including the preloading unit, is of the order of 10% to 20%-25% larger in one of the radial directions, than the very same bearing without any preloading unit. Thus, the system can be adapted for systems where there is little space available, like the one depicted in FIG. 1.

When the rotary processing unit is running, with a drum 4 inserted into the bearing unit 6, and a preloading force applied to one of the bearings, the unit exhibits a given natural frequency. The unit cannot be run at the natural frequency without affecting the output quality. Thus, is may be advantageous to be able to change the natural frequency of the unit. This can be done by changing the preloading force applied to the amplification lever 20, and thus to the bearing. In a particular embodiment of the invention, similar to the one depicted in the Figures, by changing the preloading force applied to the bearing from 4 kN to 8 kN, the natural frequency shifted from 230 Hz to 233 Hz. Also, by increasing the preload, we increase the deformation applied to the drum 4 (also outside from the bearing).

The invention claimed is:

1. A bearing unit for a rotary processing tool, the bearing unit comprising:
   two outer bearings;
   an intermediate bearing; and
   a preloading unit adapted for displacing the intermediate bearing with respect to the two outer bearings,
   wherein the intermediate bearing is accommodated in a slider which is received within a recess in a main body of the bearing unit, the slider extending from the recess to an exterior of the main body,
   wherein the preloading unit comprises an amplification lever configured to amplify an actuation force created by an actuator into a greater preloading force acting on the slider and the intermediate bearing, and
   wherein a movement of the amplification lever in a first direction provides a movement of the intermediate bearing in a second direction substantially the same as the first direction.

2. The bearing unit of claim 1, wherein the amplification lever is a one-armed lever.

3. The bearing unit of claim 1, wherein the amplification lever extends substantially parallel to an axis of rotation of the two outer bearings.

4. The bearing unit of claim 1, wherein an end of the amplification lever engages behind a support provided at the bearing unit.

5. The bearing unit of claim 4, wherein the support is a separate element fastened to the bearing unit.

6. The bearing unit of claim 4, wherein the end of the amplification lever engaging behind the support is forked.

7. The bearing unit of claim 1, wherein the preloading unit comprises a pneumatic actuator adapted for pivoting the amplification lever with respect to the bearing unit.

8. The bearing unit of claim 7, wherein the actuator comprises a piston/cylinder arrangement in which the piston is held stationary with respect to the bearing unit.

9. The bearing unit of claim 8, wherein the cylinder is formed by a through-hole in the amplification lever.

10. The bearing unit of claim 9, wherein a cover is associated with the through-hole.

11. The bearing unit of claim 8, wherein two pistons are provided which are arranged in two cylinder openings arranged along a centerline of the amplification lever.

12. The bearing unit of claim 11, wherein a connection opening is formed in the lever for establishing a pressure connection between the cylinder openings.

13. The bearing unit of claim 8, wherein a sealing element is provided for sealing between an inner wall of the cylinder and the piston arranged therein and for centering the piston within the cylinder.

14. The bearing unit of claim 8, wherein the piston rests on an abutment plate.

15. A method for changing the mechanical characteristics of a drum engaged into a bearing unit as claimed in claim 1, comprising varying the amplitude of the actuation force applied to the amplification lever of the preloading unit.

16. A bearing unit for a rotary processing tool, the bearing unit comprising:
two outer bearings;
an intermediate bearing accommodated in a slider which is received within a recess in a main body of the bearing unit; and
a preloading unit adapted for displacing the intermediate bearing with respect to the two outer bearings,
wherein the preloading unit comprises an amplification lever configured to amplify an actuation force created by an actuator into a greater preloading force acting on the slider and the intermediate bearing, and
wherein the actuator comprises a piston/cylinder arrangement in which the piston is held stationary with respect to the bearing unit.

17. A bearing unit for a rotary processing tool, the bearing unit comprising:
a main body including a recess;
a first bearing provided in the main body;
a slider movably provided in the recess;
a second bearing accommodated in the slider; and
a preloading unit adapted to displace the slider, and therefore the second bearing, with respect to the first bearing,
wherein the preloading unit includes
an amplification lever,
a cylinder provided in the amplification lever, and
a piston provided in the cylinder to provide an actuation force to the amplification lever to displace the slider.

18. The bearing unit of claim 17, wherein a pivot axis of the amplification lever is offset from the second bearing in a direction substantially parallel to an axis of rotation of the second bearing.

19. The bearing unit of claim 17, wherein the actuation force provided to the amplification lever to displace the slider and a preloading force provided by the amplification lever to the slider to displace the slider are provided on a same side of the amplification lever relative to a pivot axis of the amplification lever.

* * * * *